3,357,940
SILICONE RUBBER CONTAINING ANTI-
MONY TRISULFIDE AND CURED WITH
PEROXIDES
Samuel J. Rutherford, Whittier, Calif., assignor to
Purolator Products, Inc., Rahway, N.J., a corpora-
tion of Delaware
No Drawing. Filed Mar. 18, 1964, Ser. No. 352,945
28 Claims. (Cl. 260—37)

This application is a continuation-in-part of my copending application, Ser. No. 245,991, filed Dec. 20, 1962, now abandoned.

This invention relates to a novel form of silicone rubber, and is particularly concerned with a procedure for the production of an improved silicone elastomer having high resistance to infrared radiation and relatively low reflectance to light waves in the visible spectrum.

Silicone rubber is now widely used, particularly where resistance to high temperature is an important factor, and silicone rubbers containing vinyl groups, particularly those formed using methylvinyl siloxanes, have acquired substantial commercial usage and importance. Commercially available elastomers of this nature containing the vinyl groups include, for example, polymers of dimethyl siloxane comprising some methylvinyl siloxane and marketed as Dow Corning Silastic 432 base; copolymers composed of about 13 mole percent phenyl methyl siloxane and about 87 mole percent dimethyl siloxane and comprising some methylvinyl siloxane, and marketed as Dow Corning Silastic 440 gum; and copolymers composed of about 13 mole percent diphenyl siloxane and about 87 mole percent dimethyl siloxane and comprising some methylvinyl siloxane, and marketed as Dow Corning 446 base. The above-noted 432, 440 and 446 base materials are believed to contain from about 0.1 to about 0.5 mole percent methylvinyl siloxane. Other commercially available silicone elastomers containing the vinyl group are Dow Corning Silastic 410 gum and Dow Corning Silastic 2054 gum, the former believed to be a polymer of dimethyl siloxane and to contain on the order of about 4 mole percent methylvinyl siloxane.

This type of silicone base material is conventionally cured by addition of curing agents such as benzoyl peroxide and dichloro benzoyl peroxide, and employing fillers or pigments such as titanium dioxide, to produce elastomers of high infrared reflectivity.

However, silicone rubbers of the above type, so pigmented, while having high infrared reflectivity and good physical properties, are white and have high reflectivity in the visible spectrum. For many uses of such silicone rubbers, it is desired to preserve this high infrared reflectivity and resistance to thermal radiation, but to suppress the reflectivity in the visible spectrum.

It has been suggested that this may be accomplished by incorporating black pigments into the above-described silicone rubbers, such as carbon black, black iron oxide, aluminum powder, and antimony trisulfide ($Sb_2S_3$), all of which are conventionally employed as pigments in paints and rubbers. Of the above, antimony trisulfide yields products which have a high infrared reflectivity and a low visible reflectivity.

However, the use of antimony trisulfide in the above formulations results in products which will not cure completely. The resultant product is tacky, soft and gummy, and does not give a product suitable for molding to produce an article which has dimensional stability, hardness and other properties necessary for structural or ornamental parts.

If the ratio of conventional peroxide curing agent is increased above the amounts usually used in an effort to alleviate this problem and increase the cure, the catalyst or curing agent apparently attacks the antimony trisulfide preferentially to bleach the product and thus producing a silicone rubber product of undesirably high visible reflectivity without appreciably improving the cure.

It is accordingly an object of the invention to compound and provide a procedure for producing a silicone elastomer, preferably one formed from methylvinyl siloxanes and containing a small proportion of vinyl groups, preferably in the form of methylvinyl groups, having high thermal radiation resistance, high infrared reflectivity, reduced reflectivity in the visible spectrum, and good physical properties including hardness, tensile strength and elongation.

Another object of the invention is to afford procedure for curing a composition including a silicone elastomer containing methylvinyl groups and antimony trisulfide, to produce a cured silicone elastomer having the above-noted properties.

Another object is the provision of a process for obtaining a silicone elastomer of the aforementioned type which can be formed readily into sheets, extrusions or moldings, and certain elastomeric products thereby produced.

Other objects and advantages of the invention will appear hereinafter.

According to the invention it has been found that by heating a silicone rubber containing vinyl groups, preferably of the above-described type formed using at least some methylvinyl siloxanes, and antimony trisulfide as pigment, with a curing agent of the group consisting of ditertiary butyl peroxide, dicumyl peroxide, or 2,5-dimethyl-2,5-di(tertiary butyl peroxide) hexane, a cured elastomer can be obtained having high thermal resistance, high infrared reflectivity and low reflectivity, preferably less than about 50%, in the visble spectrum, and this product is substantially completely cured so that the resulting elastomer is non-tacky and has good physical properties. Thus, it has been found unexpectedly that the above-noted curing agents do not tend to bleach the product and hence have no adverse effect, resulting in a product having the desired high reflectance in the infrared region and low reflectance in the visible spectrum, yet such curing agents function to effect the desired cure of the elastomer within the normal curing period.

The curing agents of the invention have been found to produce greatly improved results on silicone rubber, particularly on silicone rubbers formed using methylvinyl siloxanes, such elastomers containing preferably a small proportion of methylvinyl siloxane, e.g., from about 0.05 to about 5, preferably about 0.1 to about 1 mole percent of methylvinyl siloxane. Most desirably such elastomers contain about 0.1 to about 0.5 mole percent of methylvinyl siloxane. It has been found that when the silicone rubber contains no vinyl radicals, e.g., in the case of a polymer of dimethyl siloxane which has no vinyl radicals, the above curing agents of the invention are not effective.

The silicone rubbers which can be employed to produce the improved elastomeric products of the invention include, for example, the polymers of dimethyl siloxane, as represented by the above-noted Dow Corning bases 410 and 432, copolymers of phenyl methyl siloxane and dimethyl siloxane, as represented by the above Dow Corning base 440, and copolymers of diphenyl siloxane and dimethyl siloxane, as represented by the recently commercially introduced Dow Corning 446 base, noted above, each of such silicone polymers or copolymers containing methylvinyl siloxane within the approximately 0.50 to 5 mole percent range previously set forth. The amount of silicone base employed in the composition can vary from about 80% to about 97%, usually from about 90% to about 97%, by weight, although it will be understood that the above ranges are in no sense critical.

The amount of curing agent or catalyst of the invention, e.g., ditertiary butyl peroxide, preferably employed to produce the improved results hereof can vary from about 0.1 to about 6%, usually about 1% to about 4%, by weight of the composition, although here, also, the curing agent can be employed in amounts outside the above ranges, while obtaining somewhat less favorable results. The curing agents may be used separately or in combination, e.g., a mixture of ditertiary butyl peroxide and dicumyl peroxide.

The antimony trisulfide is preferably employed in an amount ranging from about 1% to about 10%, usually about 2% to about 5%, by weight of the composition. However, it will be understod by those skilled in the art that amounts outside the above ranges can be employed, depending on the particular properties of the elastomer desired.

If desired, other pigments can also be present in the composition. Such pigments may be of varying color, depending upon the final color to be imparted to the elastomeric product. Preferred colors for the product having the proper reflectance characteristics noted above may range from a light gray to black. To attain a light gray color, it may be advantageous to include with the antimony trisulfide, pigments such as, for example, titanium dioxide, a white pigment. Such additional pigments, e.g., titanium dioxide, can be employed in amounts within the range of about 1% to about 20%, usually about 2% to about 10%, by weight of the composition, although here also, amounts of such additional pigments outside the above ranges can also be employed.

In usual practice the silicon rubber base is mixed or milled together with the antimony trisulfide, additional pigment such as titanium dioxide, if employed, and the curing agent. The resulting mixture or composition is then subjected to heat at temperatures ranging from about 200 to about 400° F. for a period of time of about 5 to about 30 minutes to effect the desired cure. Where the composition is to be molded, it is placed in a mold and subjected to heat at temperature within the above range and under pressure, which may range, for example, from about 50 to about 10,000 p.s.i., for the above-noted period to provide the cured molding.

The optimum curing temperature employing the curing agents of the invention is between about 300 and 360° F., with a curing time under these conditions of about 5 to about 10 minutes. If desired, in order to obtain a product of increased heat stability, the cured product can be post-cured at temperature of about 300 to about 500° F. for several hours. Employing the curing agents of this invention, optimum post-curing conditions are at temperature of about 300° F. for a period of about 4 hours.

As previously noted, the use of anitomy trisulfide as a black pigment alone or in conjunction with titanium dioxide results in an elastomer having high reflectance in the infrared region of the spectrum and suppressed reflectance in the visible region of the spectrum. Thus, a silicone elastomer containing antimony trisulfide and cured according to the invention has a high reflectance of the order of about 85% in the infarared region of wave lengths greater than about 1.0 micron and a reflectance of only about 40% in the visible region of the spectrum at wave lengths below about 1.0 micron. These reflectance values are based on monochromatic reflectivity and are expressed as the ratio or percentage of total energy reflected to total incident energy.

The lower absorption of radiant heat energy by the elastomer produced by the invention results in a lower temperature rise under high intensity radiant exposure.

Particularly as result of the use of the curing agents of the invention, in conjunction with the antimony trisulfide pigment, the resulting non-tacky cured silicone elastomer can have a shore hardness of about 30 to about 80, a tensile strength of about 800 to about 1,500 p.s.i., an elongation of the order of about 500 to about 900%, and a tear strength of the order of about 50 to about 250 lb./inch.

I have found that a preferred silicone rubber starting material for producing a cured elastomer having outstanding physical properties is the previously mentioned Dow Corning 446 base material which is a copolymer of diphenyl siloxane and dimethyl siloxane and including some methylvinyl siloxane. When cured in the presence of antimony trisulfide, and employing a curing agent according to the principles of the invention, the resulting cured elastomer can have a tensile strength in the range of about 1200 to about 1500 p.s.i., an elongation ranging from about 600 to about 900%, a tear strength in the range of about 150 to about 250 lb./inch, and a shore hardness of about 30 to about 80.

The following examples illustrate practice of the invention. In carrying out these examples the pigment or pigments were added slowly to the base silicone material, in a milling operation to disperse the pigment uniformly through the mixture, until a desired shade of color was obtained. Where curing agent or catalyst was added, this was done after the pigmentation of the elastomer. However, if desired, the curing agent can be added to the base silicone prior to pigmentation. The milled material was then formed into sheets. The resulting sheets were then placed in a mold having a cavity 6 inches square and depth of about .075 inch, between heated platens in a press, the press was closed, and the composition was subjected to heat and pressure for a sufficient time to effect a cure of the elastomer. If a post-curing operation was carried out, usually and unless otherwise stated, the molded specimen was removed from the mold and placed on an open support in a circulating air oven maintained at the desired temperature for the desired time. All parts in the examples below are expressed as parts by weight.

*Example 1*

A series of compositions were formulated in the manner described above to produce silicone elastomers employing the respective curing agents or catalysts, and the pigments noted in Table I below, in the amounts set forth therein, employing the recommended press curing temperatures and times, and also the recommended post-curing temperatures and times noted in Table II, for the respective catalysts (1) to (6) of Table I. It will be noted that one series of formulations A to F below were prepared employing titanium dioxide and another series of formulations G to L were prepared using antimony trisulfide as pigment. Catalysts (4), (5) and (6) are curing agents employed according to the invention.

TABLE I

| Components (Parts) | A | B | C | D | E | F | G | H | I | J | K | L |
|---|---|---|---|---|---|---|---|---|---|---|---|---|
| Silastic 432 base | 100 | 100 | 100 | 100 | 100 | 100 | 100 | 100 | 100 | 100 | 100 | 100 |
| Titanium dioxide | 5 | 5 | 5 | 5 | 5 | 5 | | | | | | |
| Antimony trisulfide | | | | | | | 2 | 2 | 2 | 2 | 2 | 2 |
| Catalyst (1) | 1.5 | | | | | | 1.5 | | | | | |
| Catalyst (2) | | 1.3 | | | | | | 1.3 | | | | |
| Catalyst (3) | | | 0.5 | | | | | | 0.5 | | | |
| Catalyst (4) | | | | 4.0 | | | | | | 4.0 | | |
| Catalyst (5) | | | | | 4.0 | | | | | | 4.0 | |
| Catalyst (6) | | | | | | .25–.40 | | | | | | .25–.40 |

Catalyst (1)—50% benzoyl peroxide in silicone oil containing 10% tricresyl phosphate.
Catalyst (2)—50% dichlorobenzoyl peroxide in silicone oil.
Catalyst (3)—Tertiary butyl perbenzoate.
Catalyst (4)—Ditertiary butyl peroxide.
Catalyst (5)—Dicumyl peroxide.
Catalyst (6)—2,5 dimethyl-2,5-di(tertiary butyl peroxide) hexane.

TABLE II

| Catalyst | Cure | | Post-Cure | |
|---|---|---|---|---|
| | Temp., °F. | Time (Min.) | Temp., °F. | Time (Hr.) |
| Catalyst (1) | 260 | 5 | 300 | 4 |
| Catalyst (2) | 240 | 5 | 300 | 4 |
| Catalyst (3) | 300 | 5 | 300 | 4 |
| Catalyst (4) | 340 | 10 | 300 | 4 |
| Catalyst (5) | 340 | 10 | 300 | 4 |
| Catalyst (6) | 320–360 | 10 | 300 | 4 |

The resulting cured elastomer produced from each of the above compositions A to F containing titanium dioxide was a white product having a high reflectance of the order of about 95% in the visible region and also in the infrared region of the spectrum. Each of such elastomers had a shore hardness of about 40, a tensile strength of about 1,000 p.s.i., an elongation of about 500% and a tear strength of about 100 lbs./inch.

The resulting cured elastomer produced from each of the compositions G to L containing antimony trisulfide was a black product having a suppressed reflectance of about 40% in the visible region and a high reflectance of about 85% in the infrared region. However, compositions G, H and I did not cure sufficiently and had a tacky surface and inferior physical strength. The elastomeric product formed from compositions J, K and L containing antimony trisulfide and catalyst (4), (5) or (6) according to the invention, on the other hand, cured completely and had a shore hardness of about 40, a tensile strength of about 1,000 p.s.i., an elongation of about 500% and a tear strength of about 100 lb./inch.

Thus, the elastomers formed from compositions J, K and L according to the invention have a low reflectance in the visible spectrum as contrasted to the high reflectance values in the visible spectrum for products formed from compositions A to F containing titanium dioxide, while at the same time being completely cured, with good physical properties, as contrasted to the inferior products produced from compositions G, H and I, not employing the catalysts of the invention. This clearly shows the improved results obtained employing the catalysts of the invention in combination with the antimony trisulfide for curing the silicone rubber containing vinyl groups, e.g., in the form of methylvinyl siloxane, described above.

*Example 2*

About 100 parts of Dow Corning Silastic 432 base and 10 parts of titanium dioxide are blended together, and the mixture milled with one part antimony trisulfide to obtain a milled composition having a light gray color. About 1% of a benzoyl peroxide paste composed of about 50% benzoyl peroxide, 10% tricresyl phosphate, and 40% silicone oil, is milled into the composition, the product is then placed in the molding press and heated therein under pressure at temperature of about 260° F. for about five minutes. The product is then post-cured at 300° F. for a period of about 4 hours. The resulting product is tacky and lacks physical strength, indicating incomplete curing.

*Example 3*

The procedure of Example 2 is substantially repeated employing 3% of benzoyl peroxide paste as described in Example 2, instead of the 1% of Example 2.

While there is somewhat less tackiness in the resulting product as compared to that of Example 2, these products have inferior physical properties, as compared to those of the product produced from compositions A to F in Example 1, in the absence of antimony trisulfide.

*Example 4*

About 100 parts of Dow Corning Silastic 432 base and 10 parts of titanium dioxide are blended together, and the mixture milled with one part of antimony trisulfide to obtain a milled composition having a light gray color. About 1% of ditertiary butyl peroxide is milled into the composition, and the product placed in the molding press. The product is molded at about 340° F. for a period of about 10 minutes, then removed from the press and post-cured at about 300° F. for about 4 hours.

The resulting gray colored elastomer had a high thermal resistance, and infrared reflectance of about 85% and a reflectance of about 40% in the visible spectrum. The elastomer is non-tacky, and has a shore hardness of about 40, a tensile strength of about 1,000 p.s.i., an elongation of about 600%, and a tear strength of about 100 lb./inch.

*Example 5*

The procedure of Example 4 is repeated, employing about 4% of ditertiary butyl peroxide. Results similar to those of Example 4 are obtained.

*Example 6*

The procedure of Example 4 is repeated employing in place of the ditertiary butyl peroxide, the same amount of dicumyl peroxide and 2,5-dimethyl-2,5-di(tertiary butyl peroxide) hexane, respectively. Results similar to those of Example 4 are obtained.

Examples 4, 5, and 6 show the improved results obtained employing the catalysts of the invention in varying proportions in combination with both titanium dioxide and antimony trisulfide pigments in silicone rubbers containing vinyl groups, specifically methylvinyl groups, for producing elastomeric products having the desired properties, as compared to the products of inferior physical properties obtained when employing other catalysts such as benzoyl peroxide, as described in Examples 2 and 3.

*Example 7*

The procedure of Example 1 is repeated employing a composition the same as Composition J, except employing in place of Silastic 432 base, the same amount of Silastic 410 gum. The resulting cured elastomer has properties similar to those of the cured elastomer produced from Composition J, including low reflectance in the visible spectrum and high reflectance in the infrared region.

Example 8

The procedure of Example 4 is repeated, except that in place of the Silastic 432 base, an equal amount of Silastic 440 gum is employed. The resulting cured elastomer has properties similar to those of the cured elastomer produced in Example 4, including low reflectance in the visible spectrum and high reflectance in the infrared region.

Example 9

About 100 parts of Dow Corning 446 base and four parts of a master color batch composed of two parts of Dow Corning 432 base and two parts of antimony trisulfide were blended and milled to obtain a milled composition of black color. About five parts of a molecular sieve containing about 15% (0.75 parts) of ditertiary butyl peroxide, and about 0.1 part tertiary butyl perbenzoate are milled into the composition and the product placed in a molding press. The small amount of tertiary butyl perbenzoate is added as an accelerator to enhance the hardness of the cured product. The product is molded at 340° F. for about ten minutes, then removed from the press and post-cured at about 300° F. for about four hours.

The resulting cured black elastomeric product has a high thermal resistance and is non-tacky. Such product has an average tensile strength of 1250 p.s.i., an average elongation of about 820%, and an average tear strength of about 164 lb./inch.

Example 10

About 100 parts of Dow Corning 446 base and two parts of silica and about 7.5 parts of a master batch composed of about 3.75 parts of Dow Corning 432 base and 3.75 parts of a mixture of titanium dioxide and antimony trisulfide in an approximate proportion of about two to one titanium dioxide to antimony trisulfide, are blended together, and the mixture milled to obtain a composition having a light gray color. About 0.5 part of 2,5-dimethyl-2,5-di(tertiary butyl peroxide) hexane is milled into the composition and the product placed in the molding press. The product is molded at about 340° F. for a period of of about ten to 15 minutes, then removed from the press and post-cured at 300° F. for twelve hours.

The resulting gray-colored elastomer has a high thermal resistance and is non-tracky. The elastomeric product has an average tensile strength of 1470 p.s.i., an average elongation of 830%, and an average tear strength of about 203 lbs./inch.

Example 11

About 100 parts of Dow Corning 446 base, two parts of silica, and four parts of a master batch composed of two parts of Dow Corning 432 base and two parts of antimony trisulfide are blended together and the mixture milled to obtain a milled composition having a black color. About five parts of a molecular sieve containing 15% (0.75 part) di-tertiary butyl peroxide is milled into the composition and the product placed in the molding press, the product is molded at about 340° F. for a period of about 15 minutes, then removed from the press and post-cured at 300° F. for 24 hours.

The resulting black elastomeric product has a high thermal resistance and is non-tacky. The elastomer has an average tensile strength of 1270 p.s.i., an average elongation of 760% and an average tear strength of 228 lb./inch.

Example 12

About 100 parts of Dow Corning 446 base and six parts of silica and about 7.5 parts of a master color batch composed of 3.75 parts of Dow Corning 432 base and 3.75 parts of a mixture of titanium dioxide and antimony trisulfide in a proportion of two to one titanium dioxide to antimony trisulfide are blended together and the mixture milled to obtain a composition of light gray color. About 0.5 part 2,5-dimethyl-2,5-di(tertiary butyl peroxide) hexane is milled into the composition and the product placed into the molding press. The product is molded at about 340° F. for a period of about 10 to 15 minutes, then removed from the press and post-cured at 300° F. for 24 hours.

The resulting gray-colored elastomeric product has a high thermal resistance and is non-tacky. The elastomer has an average tensile strength of about 1330 p.s.i., an average elongation of about 770%, and an average tear strength of about 214 lbs./inch.

Each of the cured elastomeric products produced in Examples 9 to 12, inclusive, above, both gray and black, have a suppressed reflectance of about 40% in the visible region of the spectrum and a high reflectance of about 85% in the infrared region.

Examples 9 to 12 illustrate the improved properties with respect to tensile strength, elongation and tear strength for the curled elastomer obtained using a silicone rubber or polymer containing diphenyl siloxane, as well as some methylvinyl siloxane, e.g., Dow Corning 446 base containing diphenyl siloxane (about 13 mole percent) as compared to the cured silicone elastomers prepared from the other base materials such as Dow Corning 410, 440 and 432 base materials not containing diphenyl siloxane, as exemplified by the strength values of the products produced in Example 4, employing the 432 base.

The improved thermal radiation-resistant silicone elastomers obtained by the invention procedure have usefulness in coated fabrics, sponge rubbers, electrical and thermal insulation, light and heat seals, surface finishes, and plastics in general.

From the foregoing, it is seen that the invention provides novel procedure for producing a versatile class of silicone rubber products.

While I have described particular embodiments of my invention for purposes of illustration, it should be understood that various modifications and adaptations thereof may be made within the spirit of the invention, as set forth in the appended claims.

I claim:
1. In a process for producing a cured silicone elastomer, the improvement which comprises heating a silicone rubber containing vinyl groups and antimony trisulfide with a minor proportion of a curing agent selected from the group consisting of ditertiary butyl peroxide, dicumyl peroxide, and 2,5-dimethyl-2,5-di(tertiary butyl peroxide) hexane.

2. A process for producing a cured silicone elastomer, which comprises heating a mixture of (1) a major proportion of a silicone rubber containing about 0.05 to about 5 mole percent of methylvinyl siloxane, (2) a minor proportion of antimony trisulfide, and (3) a minor proportion of a curing agent selected from the group consisting of ditertiary butyl peroxide, dicumyl peroxide, and 2,5-dimethyl-2,5-di(tertiary butyl peroxide) hexane.

3. A process for producing a cured silicone elastomer, which comprises heating at temperatures in the range from about 200 to about 400° F., a mixture of (1) about 80% to about 97% by weight of a silicone rubber containing about 0.05 to about 5 mole percent of methylvinyl siloxane, (2) about 1% to about 10% by weight of antimony trisulfide, and (3) about 0.1 to about 6% by weight of a curing agent selected from the group consisting of ditertiary butyl peroxide, dicumyl peroxide, and 2,5-dimethyl-2,5-di(tertiary butyl peroxide) hexane.

4. A process as defined in claim 3, said mixture including about 1 to about 20% by weight of titanium dioxide.

5. In the process for producing a cured silicone elastomer, the improvement which comprises heating a silicone rubber selected from the group consisting of polymers of dimethyl siloxane, copolymers of phenyl methyl siloxane and dimethyl siloxane, and copolymers of diphenyl siloxane and dimethyl siloxane, and containing about 0.05 to about 5 mole percent methylvinyl siloxane, and antimony trisulfide, with a minor proportion of a curing agent selected from the group consisting of ditertiary butyl peroxide, dicumyl peroxide, and 2,5-dimethyl-2,5-di(tertiary butyl peroxide) hexane.

6. A process for producing a cured silicone elastomer, which comprises heating a mixture of (1) a major proportion of a silicone rubber selected from the group consisting of polymers of dimethyl siloxane, copolymers of phenyl methyl siloxane and dimethyl siloxane, and copolymers of diphenyl siloxane and dimethyl siloxane, and containing about 0.05 to about 5 mole percent methylvinyl siloxane, (2) about 1% to about 10% by weight of antimony trisulfide, and (3) about 0.1% to about 6% by weight of a curing agent selected from the group consisting of ditertiary butyl peroxide, dicumyl peroxide, and 2,5-dimethyl-2,5-di(tertiary butyl peroxide) hexane.

7. A process as defined in claim 6, said silicone rubber containing from about 0.1 to about 1 mole percent of methylvinyl siloxane.

8. A process for producing a cured silicone elastomer, which comprises heating at temperatures in the range from about 200 to about 400° F. a mixture of (1) a major proportion of a silicone rubber selected from the group consisting of polymers of dimethyl siloxane, copolymers of phenyl methyl siloxane and dimethyl siloxane, and copolymers of diphenyl siloxane and dimethyl siloxane, and containing about 0.05 to about 5 mole percent methylvinyl siloxane, (2) a minor proportion of titanium dioxide, (3) a minor proportion of antimony trisulfide, and (4) about 0.1% to about 6% by weight of a curing agent selected from the group consisting of ditertiary butyl peroxide, dicumyl peroxide, and 2,5-dimethyl-2,5-di(tertiary butyl peroxide) hexane.

9. A process for producing a cured silicone elastomer, which comprises heating at temperatures in the range from about 200 to about 400° F. (1) about 80% to about 97% by weight of a silicone rubber selected from the group consisting of polymers of dimethyl siloxane, copolymers of phenyl methyl siloxane and dimethyl siloxane, and copolymers of diphenyl siloxane and dimethyl siloxane, and containing about 0.1 to about 1 mole percent methylvinyl siloxane, (2) about 2% to about 5% by weight of antimony trisulfide, and (3) about 1% to about 4% by weight of a curing agent selected from the group consisting of ditertiary butyl peroxide, dicumyl peroxide, and 2,5-dimethyl-2,5-di(tertiary butyl peroxide) hexane.

10. A process for producing a cured silicone elastomer, which comprises heating at temperatures in the range from about 200 to about 400° F. (1) about 80% to about 97% by weight of a silicone rubber selected from the group consisting of polymers of dimethyl siloxane, copolymers of phenyl methyl siloxane and dimethyl siloxane, and copolymers of dipheyl siloxane and dimethyl siloxane, and containing about 0.1 to about 1 mole percent methylvinyl siloxane, (2) about 2% to about 10% by weight of titanium dioxide, (3) about 2% to about 5% by weight of antimony trisulfide, and (4) about 1% to about 4% by weight of a curing agent selected from the group consisting of ditertiary butyl peroxide, dicumyl peroxide, and 2,5-dimethyl-2,5-di(tertiary butyl peroxide) hexane.

11. A process as defined in claim 6, wherein said mixture is heated at temperatures between about 300 and 360° F.

12. A process as defined in claim 9, wherein said mixture is heated at temperatures between about 300 and 360° F.

13. A process as defined in claim 3, and including post-curing the resulting product at temperature of about 300 to about 500° F.

14. A process as defined in claim 9, and including post-curing the resulting product at temperature of about 300 to about 500° F.

15. A process for producing a cured molded silicone elastomer, which comprises heating under pressure and at temperature in the range from about 200 to about 400° F. a mixture of (1) a major proportion by weight of a silicone rubber containing about 0.05 to about 5 mole percent methylvinyl siloxane, (2) about 1% to about 10% by weight of antimony trisulfide, and (3) about 0.1% to about 6% by weight of a curing agent selected from the group consisting of ditertiary butyl peroxide, dicumyl peroxide, and 2,5-dimethyl-2,5-di(tertiary butyl peroxide) hexane.

16. A process as defined in claim 15, and including post-curing the resulting product at temperature of about 300 to about 500° F.

17. A process for producing a cured silicone elastomer, which comprises heating at temperatures in the range from about 200 to about 400° F. a mixture of (1) a major proportion of a silicone rubber in the form of a copolymer of diphenyl siloxane and dimethyl siloxane and including a minor amount of methylvinyl siloxane, (2) a minor proportion of antimony trisulfide and (3) about 0.1% to about 6% by weight of a curing agent selected from the group consisting of ditertiary butyl peroxide, dicumyl peroxide, and 2,5-dimethyl-2,5-di(tertiary butyl peroxide) hexane.

18. A process for producing a cured silicone elastomer, which comprises heating at temperature in the range from about 200 to about 400° F. (1) about 80% to about 97% by weight of a silicone rubber in the form of a copolymer of diphenyl siloxane and dimethyl siloxane and containing about 0.1 to about 1 mole percent methylvinyl siloxane, (2) about 1% to about 10% by weight of antimony trisulfide, and (3) about 0.1% to about 6% by weight of a curing agent selected from the group consisting of ditertiary butyl peroxide, dicumyl peroxide, and 2,5-dimethyl-2,5-di(tertiary butyl peroxide) hexane.

19. A process for producing a cured silicone elastomer which comprises heating at temperatures in the range from about 200 to about 400° F. (1) about 80% to about 97% by weight of a silicone rubber in the form of a copolymer composed of about 13 mole percent diphenyl siloxane and about 87 mole percent dimethyl siloxane, and containing about 0.1 to about 0.5 mole percent methylvinyl siloxane, (2) about 1% to about 10% by weight of antimony trisulfide, and (3) about 0.1% to about 6% by weight of a curing agent selected from the group consisting of ditertiary butyl peroxide, dicumyl peroxide, and 2,5-dimethyl-2,5-di(tertiary butyl peroxide) hexane.

20. A process for producing a cured silicone elastomer, which comprises heating at temperatures in the range from about 200 to about 400° F. (1) about 80% to about 97% by weight of a silicone rubber in the form of a copolymer composed of about 13 mole percent diphenyl siloaxne and about 87 mole percent dimethyl siloxane, and containing about 0.1 to about 0.5 mole percent methylvinyl siloxane, (2) about 1 to about 20% by weight of titanium dioxide, (3) about 1% to about 10% by weight of antimony trisulfide, and (4) about 0.1% to about 6% by weight of a curing agent selected from the group consisting of ditertiary butyl peroxide, dicumyl peroxide, and 2,5-dimethyl-2,5-di(tertiary butyl peroxide) hexane.

21. A process for producing a cured silicone elastomer, which comprises heating at temperatures in the range from about 300 to about 360° F. (1) about 80% to about 97% by weight of a silicone rubber in the form of a copolymer composed of about 13 mole percent diphenyl siloxane and about 87 mole percent dimethyl siloxane, and containing about 0.1 to about 0.5 mole percent methylvinyl siloxane, (2) about 2% to about 5% by weight of antimony trisulfide, and (3) about 1% to about 4% by weight of a curing agent selected from the group consisting of ditertiary butyl peroxide, dicumyl peroxide, and 2,5-dimethyl-2,5-di(tertiary butyl peroxide) hexane.

22. A process for producing a cured silicone elastomer, which comprises heating at temperatures in the range from about 300 to about 360° F. (1) about 80% to about 97% by weight of a silicone rubber in the form of a copolymer composed of about 13 mole percent diphenyl siloxane and about 87 mole percent dimethyl siloxane, and containing about 0.1 to about 0.5 mole percent methylvinyl siloxane, (2) about 2 to about 10% by weight of titanium dioxide, (3) about 2 to about 5% by weight of antimony trisulfide, and (4) about 1% to about 4% by weight of a curing agent selected from the group consisting of ditertiary butyl peroxide, dicumyl peroxide, and 2,5-dimethyl-2,5-di(tertiary butyl peroxide) hexane.

23. A process as defined in claim 19, and including post-curing the resulting product at temperature of about 300 to about 500° F.

24. A mixture which, on heating, forms a cured silicone elastomer, which comprises (1) a major proportion of a silicone rubber in the form of a copolymer of diphenyl siloxane and dimethyl siloxane and including a minor amount of methylvinyl siloxane, (2) a minor proportion of antimony trisulfide and (3) about 0.1% to about 6% by weight of a curing agent selected from the group consisting of ditertiary butyl peroxide, dicumyl peroxide, and 2,5-dimethyl-2,5-di(tertiary butyl peroxide) hexane.

25. A mixture which, on heating, forms a cured silicone elastomer, which comprises (1) about 80% to about 97% by weight of a silicone rubber in the form of a copolymer composed of about 13 mole percent diphenyl siloxane and about 87 mole percent dimethyl siloxane, and containing about 0.1 to about 0.5 mole percent methylvinyl siloxane, (2) about 1% to about 10% by weight of antimony trisulfide, and (3) about 0.1% to about 6% by weight of a curing agent selected from the group consisting of ditertiary butyl peroxide, dicumyl peroxide, and 2,5-dimethyl-2,5-di(tertiary butyl peroxide) hexane.

26. A cured silicone elastomer comprising a cured copolymer of diphenyl siloxane and dimethyl siloxane and including a minor amount of methylvinyl siloxane and a minor proportion of antimony trisulfide, said cured elastomer having a tensile strength in the range of about 1200 to about 1500 p.s.i., an elongation ranging from about 600% to about 900%, a tear strength in the range of about 150 to about 250 lb./inch, and a shore hardness of about 30 to about 80, said elastomer having a high infrared reflectance and a low reflectance less than about 50% in the visible spectrum.

27. A cured silicone elastomer comprising a cured copolymer of about 13 mole percent diphenyl siloxane and about 87 mole percent dimethyl siloxane, and containing about 0.1 to about 0.5 mole percent methylvinyl siloxane and about 1% to about 10% by weight of antimony trisulfide, said cured elastomer having a tensile strength in the range of about 1200 to about 1500 p.s.i., an elongation ranging from about 600% to about 900%, a tear strength in the range of about 150 to about 250 lb./inch, and a shore hardness of about 30 to about 80, said elastomer having a high infrared reflectance and a low reflectance less than about 50% in the visible spectrum.

28. A cured silicone elastomer comprising a cured copolymer of about 13 mole percent diphenyl siloxane and about 87 mole percent dimethyl siloxane, and containing about 0.1 to about 0.5 mole percent methylvinyl siloxane, about 2% to about 10% by weight of titanium dioxide, and about 2 to about 5% by weight of antimony trisulfide, said cured elastomer having a tensile strength in the range of about 1200 to about 1500 p.s.i., an elongation ranging from about 600% to about 900%, a tear strength in the range of about 150 to about 250 lb./inch, and a shore hardness of about 30 to about 80, said elastomer having a high infrared reflectance and a low reflectance less than about 50% in the visible spectrum.

References Cited

UNITED STATES PATENTS

| 3,183,205 | 5/1965 | Bailey et al. | 260—37 |
| 3,261,802 | 7/1966 | Bobear | 260—37 |

OTHER REFERENCES

H. F. Payne, "Organic Coating Technology," John Wiley and Sons, New York, 1961, page 923.

MORRIS LIEBMAN, *Primary Examiner.*

J. E. CALLAGHAN, *Assistant Examiner.*